United States Patent [19]
Wei

[11] 3,926,909
[45] Dec. 16, 1975

[54] DIBENZYL HYDROXYL AMINE STABILIZER FOR SPANDEX

[75] Inventor: Peter Wei, Barrington, R.I.

[73] Assignee: Globe Manufacturing Co., Fall River, Mass.

[22] Filed: Aug. 16, 1974

[21] Appl. No.: 498,217

[52] U.S. Cl................260/45.85 A; 260/45.85 N; 260/45.9 R; 260/45.9 NC; 264/184; 428/265; 428/272; 428/392; 428/396
[51] Int. Cl.² .......................................... C08G 6/00
[58] Field of Search............260/45.9 QA, 45.9 R, 260/45.85 A, 45.85 N, 45.9 NC; 117/138.8 D; 428/265, 272, 392, 396; 264/184

[56] References Cited
UNITED STATES PATENTS

| | | | |
|---|---|---|---|
| 3,387,071 | 6/1968 | Cahill et al. | 264/184 |
| 3,399,167 | 8/1968 | Rosendahl et al. | 260/45.8 |
| 3,644,278 | 2/1972 | Klemchuk | 260/45.9 |

*Primary Examiner*—V. P. Hoke
*Attorney, Agent, or Firm*—Cushman, Darby & Cushman

[57] ABSTRACT

Dibenzyl hydroxylamine and related compounds are stabilizers for protecting spandex and other forms of polyurethanes against discoloration in exposure to combustion fumes, ultraviolet light and smog atmosphere.

16 Claims, No Drawings

DIBENZYL HYDROXYL AMINE STABILIZER FOR SPANDEX

The present invention relates to the stabilization of spandex fibers and other forms of polyurethanes against discoloration.

It is known that polyurethanes derived from aromatic diisocyanates are susceptible to discoloration upon exposure to combustion fumes, ultraviolet light and smog atmosphere. This problem is dealt with, for example, in Sadowski U.S. Pat. No. 3,095,322; Muhlhausen U.S. Pat. No. 3,164,439; Rosendahl U.S. Pat. No. 3,399,167; Oertel U.S. Pat. No. 3,454,671; Reuben U.S. Pat. No. 3,462,297; Cahill U.S. Pat. No. 3,464,851; and Oertel U.S. Pat. No. 3,485,778.

It has now been found that polyurethanes and especially spandex fibers can be protected against discoloration upon exposure to combustion fumes containing nitrogen oxides, ultraviolet light and smog atmosphere by incorporating a stabilizing quantity of a substituted hydroxylamine having the formula:

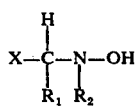

where X is phenyl or naphthyl or such a group substituted with alkyl of 1 to 12 carbon atoms, halogen, e.g., of atomic weight 9 to 80, usually of atomic weight 35 to 80, aryl, aryloxy, alkoxy, e.g., of 1 to 12 carbon atoms, usually of 1 to 4 carbon atoms, hydroxy, carboxy, ester or amide, $R_1$ and $R_2$ are X, H, benzyl.

Thus, there can be used N,N-dibenzyl hydroxylamine (hereinafter simply called dibenzyl hydroxylamine), N-monobenzyl hydroxylamine, triphenylmethyl hydroxylamine), bis (3,5-di-t-butyl-4-hydroxybenzyl)hydroxylamine, bis-(4-chlorobenzyl)hydroxylamine, bis-(4-bromobenzyl)hydroxylamine, bis-(4-fluoro-benzyl)-hydroxylamine, bis(2-chlorobenzyl)hydroxylamine, bis(2,6-dichlorobenzyl)hydroxylamine, bis(2,6-dibromobenzyl)hydroxylamine, bis(3,4-dichlorobenzyl) hydroxylamine, bis(2,4-dichlorobenzyl)hydroxylamine, bis (2-methyl-4-chloro-benzyl)hydroxylamine, 4-chlorobenzyl (benzyl hydroxylamine), bis(4-methylbenzyl)hydroxylamine, bis (3-methylbenzyl)hydroxylamine, bis(2-methylbenzyl) hydroxylamine, bis(2,4,6-trichlorobenzyl)hydroxylamine, naphthylmethyl benzyl hydroxylamine, diphenylmethyl benzyl hydroxylamine, bis(4-ethylbenzyl)hydroxylamine, bis (4-butylbenzyl)-hydroxylamine bis(4-octyl-benzyl)hydroxylamine, bis(4-dodecylbenzyl)hydroxylamine, bis(4-hydroxybenzyl) hydroxylamine, bis(4-methoxybenzyl)hydroxylamine; N-4-hydroxybenzyl, N-phenyl hydroxylamine, N-benzyl, N-phenyl hydroxylamine, bis(4-ethoxybenzyl)hydroxylamine, bis (4-carbobutoxybenzyl)hydroxylamine, bis(4-amidobenzyl) hydroxylamine, bis(4-phenoxybenzyl)hydroxylamine, bis(4-butoxybenzyl)-hydroxylamine.

The preferred substituted hydroxylamine is dibenzyl hydroxylamine.

It is critical that there be present at least one benzyl (or substituted benzyl) group in the hydroxyl-amine. Thus, hydroxylamine itself and diethyl hydroxylamine have been found ineffective to prevent discoloration upon exposure of spandex fibers to combustion fumes containing nitrogen oxides.

The amount of dibenzyl hydroxylamine used for stabilizing the spandex can vary widely, e.g., from 0.01 percent to 20 percent preferably betwen 0.1 and 10 percent of the spandex by weight and is usually at least 0.5 percent of the spandex by weight.

The term "spandex fiber" as used herein is defined in its generic sense to mean a manufactured fiber in which the fiber-forming substance is a long-chain synthetic polymer comprised of at least about 85 percent of a segmented polyurethane. The invention is not limited merely to spandex fibers but is applicable to films, woven fabrics, non-woven fabrics and any shaped article substantially composed of a spandex fiber producing polymer; therefore, the term "spandex fiber" as used herein is meant to define the above enumereated items. The segmented polyurethanes contain the recurring linkage —OCONH— and are generally prepared by a process which comprises reacting a polymeric diol with an organic diisocyanate and thereafter extending the reaction product thereof with a compound containing two active hydrogen atoms such as water, hydrazine, organic diamines, glycols, amino alcohols, etc. The diols may be a polyether glycol such as polyalkylene ether glycols, polyalkylene arylene ether glycols, polyalkylene ether-thioether glycols, and the like, or polyester glycols including polyester glycols which are the reaction products of dibasic acids with glycols as well as those derived from lactones, either with or without internal extension. The diisocyanates employed are generally arylene diisocyanates and preferably a para oriented symmetrical aromatic diisocyanate. The chain-extending agent is a compound having two active hydrogen atoms, i.e., a difunctional active hydrogen-containing compound, as determined by the tests described in J. Am. Chem. Soc. 49, 3181 (1927). Of the chain-extending agents, are well-known in the art. Examples of useful segmented polyurethanes are found in U.S. Pat. No. 2,871,227; Cacella U.S. Pat. No. 3,115,384; Cahill U.S. Pat. No. 3,387,071; Gregg U.S. Pat. No. 3,111,369; Murphy U.S. Pat. No. 3,165,566; Harper U.S. Pat. No. 3,174,949; Kohrn U.S. Pat. No. 2,953,839 and 3,009,762; and Hostettler U.S. Pat. No. 3,186,971.

The dibenzyl hydroxylamine and other stabilizers of the invention can be incorporated into the polyurethane in many ways. Thus, they can be incorporated into the polymer during manufacture or by applying to the surfaces of the end products as ingredients in dyeing, scouring, lubricating or by fuming or atomizing using a vapor carrier.

The amount required depends on the medium used. A few ppm (parts per million) is sufficient when dissolved in a solvent or dispersed in water or other polar media. A larger amount, e.g., 0.05 to 0.5 percent is usually employed when dispersed in a non-polar medium such as mineral oil.

The stabilizing effect is long lasting and is practically unaffected by scouring and solvent extraction and as stated is capable of being incorporated during polymerization and/or applied through both polar and/or non-polar media where the prior art stabilizers frequently fail.

As a lubricant ingredient, the dibenzyl hydroxylamine or other hydroxylamines of the invention are employed in an amount of 0.01 to 20 percent, preferably between 0.05 percent and 15.0 percent, based on the weight of lubricant. The amount of lubricant is normally between 0.1 percent and 15.0 percent, preferably between 0.5 percent and 10.0 percent, based on the weight of the spandex fiber. The lubricant can be applied at conventionally employed temperatures, e.g., 40°F. to 250°F., preferably between 60°F. and 200°F. Typical lubricants include mineral oil and similar hydrocarbons.

The dibenzyl hydroxylamine can also be employed as a solution in a polar organic solvent such as an alcohol, e.g., alkanols and alkanediols and alkane triols such as ethylene glycol, 1,4-butanediol, 1,3-butanediol, propylene glycol, glycerine, 1,2,6-hexanetriol, trimethylol ethane, trimethylol propane, methyl alcohol, ethyl alcohol, isopropyl alcohol, butyl alcohol and amyl alcohol, an ether, e.g., dimethyl ether, diethyl ether, dipropyl ether, diethylene glycol, triethylene glycol and dibutyl ether, dimethyl formamide, dimethyl acetamide, dimethyl sulfoxide, tetrahydrofuran, diethyl formamide, acetonitrile, propionitrile and dioxane. The amount of dibenzyl hydroxylamine or other substituted hydroxylamine is usually between 0.0001 percent and 10.0 percent, preferably between 0.001 percent and 5.0 percent based on the weight of the solvent. The solutions can be applied to the spandex fibers during manufacture at temperatures between 40°F. and just below the boiling points of the solvents but normally not higher than 200°F., preferably between 65°F. and 95°F. The solutions alternatively can also be applied to the spandex fibers after manufacture to provide the substituted hydroxylamine stabilizer.

The dibenzyl hydroxylamine can be incorporated as an additive in a polyurethane solution, such as in the case of solution spinning into an antisolvent or into hot air. The dibenzyl hydroxylamine or the like in such case is usually 0.01 to 20.0 percent, preferably between 0.1 percent and 15.0 percent based on the weight of the polymer solid.

The dibenzyl hydroxylamine or the like can also be incorporated as a component in an isocyanate-terminated prepolymer. In such case it is normally used in amount of between 0.01 percent and 15.0 percent, preferably between 0.1 percent and 10.0 percent based on the prepolymer weight.

The dibenzyl hydroxylamine or the like can also be incorporated as an ingredient in an aqueous scour liquid containing, for example, 0.1 to 5.0 percent of a nonionic, anionic, or amphoteric detergent. Such detergents include for example alkylphenoxypoly(ethyleneoxy)ethanol, e.g., p-octylphenoxypolyethyleneoxyethanol having 10 or 20 ethylene oxide units in the molecule, sodium lauryl sulfate, sodium alkyl ($C_{16}$–$C_{20}$) sulfonate, sodium sulfate ester of ethylene oxide and long chain ($C_{18}$–$C_{20}$) unsaturated alcohol condensate, sodium salt of the condensation product of naphthalene sulfonic acid and formaldehyde. Typical examples of commercially available suitable detergents are set forth in McCutcheon's "Detergents and Emulsifiers D&E 1970 Annual" (1970), the entire disclosure of which is incorporated by reference. The amount of dibenzyl hydroxylamine or the like employed is usually between 0.001 percent and 5.0 percent, preferably between 0.005 percent and 2.0 percent based on the aqueous scour liquid weight. The use of a detergent is not a part of the invention since its use is not essential but instead it is merely convenient to include the detergent. The scour is usually carried out at temperatures between 60°F and 210°F., preferably between 70°F., and 190°F.

The effectiveness of the dibenzyl hydroxylamine or the like has been demonstrated on both polyether spandex (and polyester spandex) and also on fabrics containing blends of spandex fibers with other fibers, e.g., nylon. Both natural and synthetic fibers or blends thereof can be incorporated with the spandex fibers if desired.

In using prepolymers from a polyester, or polyether and a polyisocyanate the prepolymer is usually cured with a polyamine.

As suitable amines there can be used ethylene diamine, propylene diamine, trimethylene diamine, hexamethylene diamine, diethylene triamine, triethylene tetramine, tetraethylene pentamine, 1,4-diaminocyclohexane, 3,3'-diamino-dipropyl ether diamino dibutyl sulfide, m-xylene diamine, piperazine, N-aminoethyl piperazine, N,N'-dimethyl ethylene diamine, 2-methyl piperazine, bis tallow amines made by reducing the diamides of dimerized unsaturated fatty acids, e.g., the diamine of dimerized linseed oil fatty acids.

In addition to the organic solvents mentioned above, the prepolymers can be employed with aromatic hydrocarbon solvents such as benzene, toluene, o-xylene, p-xylene, m-xylene, mixed xylenes, ethyl benzene, isopropyl benzene or butyl benzene.

The urethane prepolymers are formed by reacting an excess of polyisocyanate with the polyol, i.e., the mixture of polyester or polyether with the dihydric phenol.

The isocyanates can be aromatic or aliphatic. The polyol can include (1) a polyester from either dicarboxylic acids and glycols or by ring openings of lactones, (2) polyethers, (3) polyester-ethers, (4) caster oil products or (5) any other material containing two or more alcoholic hydroxyl groups and a hydroxyl number between 20 and 225. In order to lower the viscosity and aid in the spinning of the preopolymer a small amount of a conventional polyurethane solvent, e.g., 1 to 20 percent, preferably 5 percent, can be added prior to spinning. Typical solvents include ketones, such as acetone, methyl ethyl ketone, and methyl isobutyl ketone, substituted amides, e.g., dimethyl formamide and dimethyl acetamide, carbonates, e.g., ethylene carbonate and propylene carbonate, sulfoxides, e.g., dimethyl sulfoxide, aromatic hydrocarbons, and esters.

As polymeric materials having terminal alcoholic hydroxyl groups suitable for making prepolymers with organic polyisocyanates there can be used chain extended polyesters made from a glycol, preferably a mixture of ethylene and propylene glycols, and a saturated organic dicarboxylic acid, preferably, adipic acid. Usually, the glycol contains 2 to 20 carbon atoms. Typical examples of such glycols include ethylene glycol, propylene glycol, trimethylene glycol, 1,4-butylene glycol, 1,6-hexanediol, 1,4-butanediol, neopentyl glycol, diethylene glycol, thiodiglycol, etc. The acid usually contains 4 to 20 carbon atoms. Typical examples include succinic acid, maleic acid, dihydromuconic acid, thiodipropionic acid, adipic acid, methyl adipic acid, glutaric acid, dimerized linoleic acid, sebacic acid, suberic acid, phthalic acid, and terephthalic acid. Hydroxycarboxylic acids or their lactones can be used, e.g., epsilon caprolactone, in forming the polyesters. As stated, mixtures of various dibasic acids and glycols can be used to form mixed esters.

An excess of the glycol over the acid is used in preparing the polyesters so that the resulting polyester contains terminal hydroxyl groups. Usually such an amount of glycol is used as to give a polyester having a hydroxyl number of 20 to 225 and preferably 30 to 75, and a low acid value, e.g., less than 6 and preferably less than 1. The molecular weight of the polyester usually ranges from 500 to 5,000 and preferably 1,500 to 4,000. In general the most suitable polyesters having melting point levels of 90° C. or lower and preferably not over 60° C. Less suitably, natural polyesters can be used, e.g., castor oil, as well as blown drying oils, such as blow tung oil, linseed oil and soya oil.

Some functional branching may be present. If this is not present in the polyester it can be introduced through allophanate formation. Only a small amount is needed, i.e., a functionality above 2.1 but usually not over 2.5.

Other examples of suitable polyesters for use in preparing the prepolymer are polyethylene adipate, polyethylene adipate-phthalate and polyneopentyl sebacate. Small amounts of trialcohols such as trimethylolpropane or trimethylolethane may be included in preparing the glycoldicarboxylic acid polyesters and such modified forms of polyester are included within the term of polyester as used herein.

As an alternative to the polyesters there may be used for reaction with the polyisocyanate one or more elastomeryielding polyethers. Such polyethers are typically anhydrous chain extended polyethers possessing ether linkages separated by hydrocarbon chains either alkyl or aryl in nature. The ether should also contain terminal groups reactive to isocyanate, such as alcoholic hydroxyl groups. Such polyethers may be linear or branched. Usually, the polyethers are chiefly linear with a melting point of not over 90°C., preferably not over 60°C. The molecular weight may range from 500 to 5,000, hydroxyl number of 225 to 22, but preferably is within the range of 750 to 3,500 (hydroxyl number of 150 to 32). Preferred polyethers have the formula $H(OR)_nOH$ where R is a lower alkylene group (2 to 6 carbon atoms) and n is an integer so that the molecular weight falls within the range specified. Examples of polyethers are polyethylene glycol, polypropylene glycol, mixed polyethylene glycol-polypropylene glycol, polytetramethylene glycol (e.g., of 1,000 molecular weight).

Polyethers not only can be used in place of the polyesters but can be used in conjunction therewith. Examples of such compounds are polydiethylene glycol adipate and polytriethylene glycol adipate. Further examples of polyesters and polyethers which are suitable are set forth in Kohrn U.S. Pat. No. 2,953,839 and the patents cited therein in column 2, lines 56–68.

The polyester or polyether (including polyetherester) and phenol is reacted or "capped" with a diisocyanate using a considerable molar excess, commonly from a 20 to a 250 percent, and preferably from a 50 to a 200 percent, molar excess of the amount of diisocyanate required to react with all of the alcoholic hydroxy groups furnished by the polyester or polyether. The reaction is frequently effected by mixing the polyester or polyether and phenol with the diisocyanate either at room temperature or at a moderately elevated temperature, e.g., 70° to 150°C. to form an uncured liquid prepolymer which is soluble in methyl ethyl ketone. The prepolymer is essentially a linear polyurethane having terminal isocyanate groups. The reaction is preferably carried out at 90° to 100°C.

Representative of the preferred aromatic diisocyanates that may be mentioned by way of nonlimiting examples are m- and p-phenylene diisocyanate, tolylene diisocyanate (65 percent 2,4 and 35 percent 2,6 or 80 percent 2,4 and 20 percent 2,6 and 100 percent 2,4), p,p'-diphenyl diisocyanate, 1,5-naphthalene diisocyanate, p,p'-diphenyl-methane diisocyanate, 3,3'-bi-tolylene-4,4'-diisocyanate, 2,4-tolylene diisocyanate dimer, dianisidine diisocyanate, 4-chloro-1,3-phenylene diisocyanate. Aliphatic and cycloaliphatic diisocyanates can also be used such as 1,4-tetramethylene diisocyanate, 1,6-hexamethylene diisocyanate, 1,10-decamethylene diisocyanate, 1,4-cyclohexylene diisocyanate, 4,4'-methylene-bis(cyclohexylisocyanate) and 1,5-tetrahydronaphthalene diisocyanate. Other diisocyanates can be employed including those set forth in Kohrn U.S. Pat. No. 2,953,839, as well as those mentioned in the patents set forth in Kohrn. There can be included triisocyanates or higher isocyanates in order to get added functionality in the coagulating bath. Such isocyanates include PAPI (phenylmethylene isocyanate trimer), 2,4,4'-diphenyl ether triisocyanate, 4,4',4''-triisocyanate triphenylmethane, toluene 2,4,6-triisocyanate.

Curing can be done at 65° to 205°C. for a time as little as a few seconds up to several hours and can be as much as 30 hours. Most conveniently a temperature is selected at which a curing time of 1 minute or less, e.g., 15 seconds, can be employed.

Unless otherwise indicated, all parts and percentages are by weight.

DBHA is an abbreviated for dibenzyl hydroxylamine.

Igepal CO210 is nonylphenoxy-poly(ethyleneoxy) ethanol marketed by GAF.

Orvus K is a detergent marketed by Procter and Gamble and is a modified ammonium alkyl sulfate.

EXAMPLE 1

1 gram of DBHA was heated with 9 grams of a mineral oil (50/60) Saybolt viscosity at 100°F) at 175°F. until a complete solution was obtained. A skein of white spandex and a piece of unfinished fabric composed of unpigmented nylon and spandex were dipped in this solution at 175°F. and excess liquid was blotted off with paper. The resulting products remained white while the control samples turned yellow after exposure to natural gas combustion fumes in an oven at 160°F. for 24 hours.

Substituting DBHA by diethylhydroxylamine, the product was as yellow as the control after the gas oven test.

EXAMPLE 2

10 grams of DBHA, 90 grams of mineral oil and 3 grams of Igepal CO 210 were ball-milled for 72 hours to give a fine dispersion having a viscosity of 120 cps at 80°F. This dispersion was applied at room temperature to 265 denier white spandex during manufacture on a production machine using a small portable lubricant applicator. Sample fibers containing 2 percent, 5 percent and 10 percent of this lubricant based on the weight of the fiber were obtained by adjusting the applicator roll speed. All three samples remained white while the control turned yellow during the gas oven exposure.

Extraction of 10 grams each of the DBHA treated products with methylene chloride three times using 100 ml each time did not impair the protection shown by the gas oven test.

EXAMPLE 3

The contents of four jars filled with 50 grams of DBHA, 450 grams of mineral oil, 15 grams of Igepal CO 210, and varying amounts (a. 2.5 grams; b. 1.0 grams; c. 0.5 grams; and d. 0.25 grams) of a silicone oil were ball-milled for 72 hours. These dispersions were applied as lubricants at room temperature to 2920 denier white spandex during manufacture on a production machine using a small portable lubricant applicator. All the products remained white after the gas oven test.

EXAMPLE 4

The lubricant of Example 3 item a. was also applied to 280 denier clear unpigmented spandex at 5.65 percent lubricant content. The product remained clear (translucent or sheer) in appearance and produced no color change after gas oven exposure while the control clear spandex became intensely yellow.

EXAMPLE 5

800 grams of a polyethylene propylene adipate resin modified with trimethylol-propane to increase the functionality (2.33 functionality and 36 hydroxyl number) and 100 grams of tolylene diisocyanate (a mixture of 20/80 ratio of m/p isomers) were stirred and heated at 94°C. for 3.5 hours to give an isocyanate-terminaled prepolymer, which was found to have 2.70 percent NCO and 520,000 cps viscosity at 78°F. At the end of the reaction, the prepolymer was cooled to 65°C. A solution of 18 grams DBHA in 45 grams of toluene was added to the prepolymer and stirred at 65°C. for an hour. The resulting mixture was found to have 2.5 percent NCO and 190,000 cps viscosity at 78°F. The prepolymer was spun on a reaction spinning machine to obtain an 8-filament spandex with the following properties: 2.5 mg per ft. weight, 700 percent elongation, 4.5 ounce tensile and 0.029/0.041 gram per denier modulus at 200/250 percent elongation on second extension. The product did not change color as a result of gas oven exposure.

EXAMPLE 6

A mixture of two different molecular weight polytetramethylene ether glycol resins, (160 grams of 200° molecular weight resin and 40 grams of 1000 molecular weight resin) was mixed with 63 grams of MDI (p,p'-methylene diphenyl diisocyanate) and heated at 70°C. for 3 hours to give an isocyanate-terminated prepolymer having 3.71 percent NCO content. The prepolymer was cooled to 50°C. and diluted with 496 grams of DMF (dimethylformamide). This diluted solution had 1.06 percent NCO content. A mixture comprising 10.2 grams of 1M diethanolamine, 30.7 grams of 1M hydrazine, 61.4 grams of 1M ethylenediamine all in DMF and 200 grams of additional DMF containing 15 grams of dissolved DBHA was added to the diluted preopolymer solution and stirred for one hour to give a solution containing 25 percent solid polyether urethane and having 78,000 cps viscosity at 78°F. This polymer solution was extruded by means of a syringe into a water bath at 150°F. The resulting spandex was heated in an oven at 300°F. for 30 minutes and tested for the gas oven discoloration. This spandex did not turn yellow during the gas oven test, whereas the control, similarly prepared but with DBHA omitted became yellow during the test.

EXAMPLE 7

A mixture of 0.25 ml ORVUS K 0.1 grams of trisodium phosphate and 100 ml of water was stirred and heated to 180°F. 0.05 grams of DBHA dissolved in 1 ml of isopropanol was added and subsequently a sample nylon fabric containing clear spandex was introduced to the bath. The total contents were heated at 180°F. for 30 minutes. The fabric, so-scoured, was rinsed with clear water and was found to have no discoloration as a result of gas oven exposure; whereas, the control fabric similarly scoured but with DBHA omitted, was badly discolored from the gas oven. The fabric after being scoured in the presence of DBHA and after subsequent scouring three times without DBHA was found to have the protection retained.

Substituting DBHA by hydroxylamine, $H_2NOH$, in the scour liquor was found to produce more gas oven discoloration on the fabric than scouring in the absence of hydroxylamine.

In Examples 1-4 the spandex was made in accordance with Examples 5 & 10 of Cahill U.S. Pat. No. 3,387,071.

What is claimed is:

1. Polyurethane stabilized against fume discoloration having incorporated therein a substituted hydroxylamine of the formula

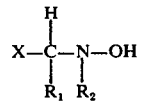

where X is a phenyl or naphthyl group or such a group substituted with alkyl of 1 to 12 carbon atoms, halogen, aryl, aryloxy, alkoxy, hydroxy, carboxy, ester or amide and $R_1$ and $R_2$ are X, H or benzyl, the amount of substituted hydroxylamine being sufficient to effectively stabilize against fume discoloration.

2. A polyurethane according to claim 1 in the form of spandex fiber.

3. A spandex fiber according to claim 2 wherein X is phenyl, or phenyl substituted with alkyl of 1 to 12 carbon atoms, halogen of atomic weight 9 to 80, phenyl, phenoxy, alkoxy of 1 to 12 carbon atoms, hydroxy, carboxy, carbo-lower alkoxy, or amide.

4. A spandex fiber according to claim 3 wherein X is phenyl or phenyl substituted with alkyl of 1 to 4 carbon atoms, chlorine, alkoxy of 1 to 4 carbon atoms, hydroxy, carboxy, carboalkoxy wherein the alkoxy has 1 to 4 carbon atoms or amide.

5. A spandex fiber according to claim 4 wherein X is phenyl or phenyl substituted with alkyl of 1 to 4 carbon atoms, chlorine or hydroxy.

6. A polyurethane according to claim 1, wherein the substituted hydroxylamine is dibenzyl hydroxylamine.

7. A polyurethane according to claim 6 in the form of spandex fiber.

8. A spandex fiber according to claim 7 containing 0.01 to 20 percent of the dibenzyl hydroxylamine.

9. A spandex fiber according to claim 8 containing 0.1 to 10 percent of the dibenzyl hydroxylamine.

10. A spandex fiber according to claim 9 containing 0.5 to 5 percent of the dibenzyl hydroxylamine.

11. A process of preparing the product of claim 7 comprising incorporating the dibenzyl hydroxylamine with a polyurethane prepolymer and then forming the spandex fiber after the incorporation.

12. A process according to claim 11, wherein the spandex fiber is formed by reaction spinning the prepolymer.

13. A process according to claim 11, wherein the spandex fiber is formed by solution extrusion into a nonsolvent for the polyurethane.

14. A process of preparing the product of claim 7 comprising incorporating the dibenzyl hydroxylamine in a lubricant for the spandex fiber and then applying the lubricant to the spandex fiber.

15. A process according to claim 14 wherein the lubricant is mineral oil.

16. A process of preparing the product of claim 7 comprising incorporating the dibenzyl hydroxylamine in an aqueous scour liquor for the spandex fiber and then applying the aqueous scour liquor to the spandex fiber.

* * * * *